United States Patent [19]
McCammon

[11] Patent Number: 5,803,524
[45] Date of Patent: Sep. 8, 1998

[54] SIDEWALL PROTECTION PANEL WITH EXPANSION ACCOMMODATING MEMBERS

[75] Inventor: Jerry J. McCammon, Rochester Hills, Mich.

[73] Assignee: Durakon Industries, Inc., Lapeer, Mich.

[21] Appl. No.: 839,403

[22] Filed: Apr. 11, 1997

Related U.S. Application Data

[63] Continuation of Ser. No. 583,288, Jan. 5, 1996, abandoned.

[51] Int. Cl.$^6$ .................................................. B60R 13/01
[52] U.S. Cl. ...................... 296/39.1; 296/39.2; 296/39.3
[58] Field of Search ................. 296/39.1, 39.2, 296/39.3; 52/506.02, 506.03, 460, 461, 396.1, 393, 396.07, 396.09, 396.02, 396.03, 396.06; 402/30, 28

[56] References Cited

U.S. PATENT DOCUMENTS

| | | | |
|---|---|---|---|
| 2,043,519 | 6/1936 | Rowe | 52/461 |
| 2,900,965 | 8/1959 | Witzke | 52/506.02 |
| 3,393,920 | 7/1968 | Ehrlich | 280/106 |
| 3,832,820 | 9/1974 | Eggert | 52/461 |
| 4,161,335 | 7/1979 | Nix et al. | 296/39.2 |
| 4,321,780 | 3/1982 | Hooper et al. | 52/461 |
| 4,420,183 | 12/1983 | Sherman | 296/181 |
| 4,635,422 | 1/1987 | Nowack et al. | 52/461 |
| 4,651,488 | 3/1987 | Nicholas et al. | 52/396 |
| 4,917,431 | 4/1990 | McDonald | 296/39.1 |
| 4,958,876 | 9/1990 | Diaco et al. | 296/39.2 |
| 5,007,670 | 4/1991 | Wise | 296/39.1 |
| 5,020,294 | 6/1991 | Duda | 52/573 |
| 5,139,300 | 8/1992 | Carriere | 296/39.1 |
| 5,185,980 | 2/1993 | Rydberg et al. | 52/506 |
| 5,221,119 | 6/1993 | Emery | 296/39.2 |
| 5,269,447 | 12/1993 | Gower et al. | 224/42.42 |
| 5,365,713 | 11/1994 | Nicholas et al. | 52/573.1 |

*Primary Examiner*—Russell D. Stormer
*Assistant Examiner*—Jason Morrow
*Attorney, Agent, or Firm*—Brinks Hofer Gilson & Lione

[57] ABSTRACT

Interior sidewall protection panels for a cargo van incorporate expansion absorbers which allow equalization the disparate thermal expansions of the sidewall panel and the cargo van without causing distortion of the panel. The sidewall protection panel includes a plurality of horizontally ribbed or convoluted regions which are interrupted by flat vertical strips or panels which align with the vertical braces or strainers on the interior of the cargo van. At the intersection of the horizontally ribbed regions with the flat vertical strips is a U-shaped expansion accommodating member. The sidewall protection panel is secured to the vertical strainers of the cargo van by semi-permanent, positive fastening means. Given a sidewall protection panel having a length of between six and eight feet (1.83 to 2.44 meters), a temperature rise of 60° F. (33° C.) may cause free expansion of a typical sidewall panel of from one-half to three-quarters of an inch (12.7 mm to 19.05 mm) more than the body of the van. The U-shaped expansion accommodating members absorb this disparate thermal expansion and eliminate unsightly and possibly damaging distortion of the sidewall panel. Furthermore, the positive securement of the panel to the cargo van strainers simplifies product design and installation and improves interior aesthetics.

17 Claims, 4 Drawing Sheets

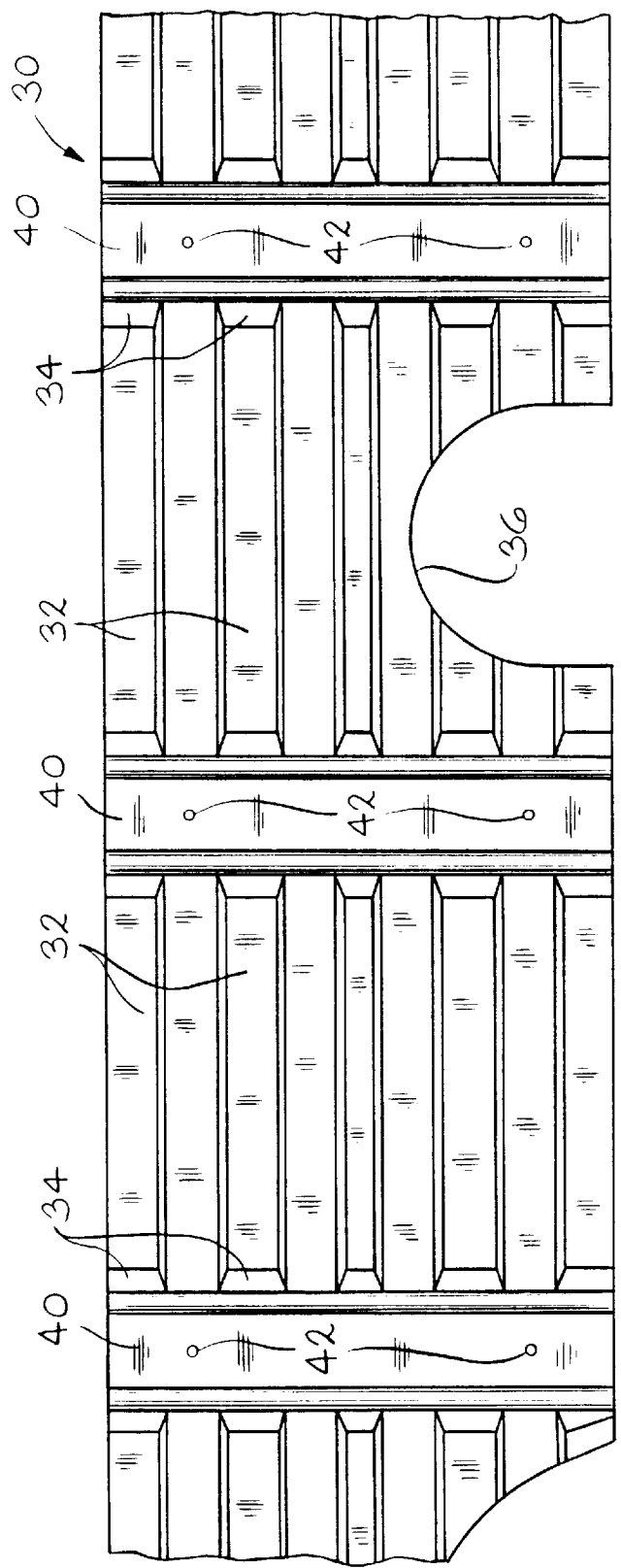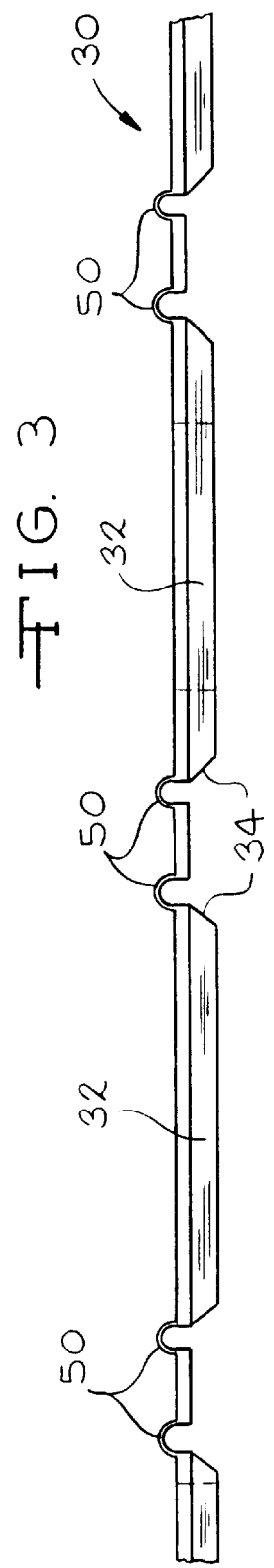
FIG. 3
FIG. 4

SIDEWALL PROTECTION PANEL WITH EXPANSION ACCOMMODATING MEMBERS

This is a File Wrapper Continuation of Applicant's earlier application, Ser. No. 08/583,288, filed Jan. 5, 1996, now abandoned.

BACKGROUND OF THE INVENTION

The invention relates generally to interior protective panels fabricated of polymeric material for cargo vans and more specifically to a sidewall protection panel for a cargo van having a plurality of expansion members which accommodate the disparate thermal expansion rates of the polymeric protection panels and the metal van body.

Many small and medium size cargo and utility vans have single thickness body sidewalls. That is, a single thickness metal panel forms the exterior of the body and the opposite side of the panel is the inside wall of the cargo hold of the van or truck. This metal panel is typically reinforced by a plurality of spaced apart, vertically oriented braces or strainers which extend from the floor to the ceiling of the van and conform to the exterior profile of the sheet metal.

While this construction provides a vehicle body exhibiting good rigidity and strength to weight ratio, an inherent problem of this single thickness panel design is that objects in the van, if not properly secured, may slide laterally and dent the metal skin of the van. While the concave dent in the interior of the van may go unnoticed, the complementary convex dent on the outside of the cargo van will likely be both noticed and deemed unacceptable.

In response to this problem, manufacturers have fabricated and installed interior panels which prevent contact of sliding objects with the interior surface of the sidewall or skin of the cargo van. Such panels are typically fabricated of a polymeric material such as relatively light in weight as well as suitably strong and resilient.

While panels fabricated of such polymeric materials satisfy the engineering requirements of strength and minimal weight, when installed in the typical cargo van fabricated of welded steel stampings, another difficulty is created. The thermal expansion rate of the typical high density polymer is many times that of steel and if, as is typical, the sidewall protection panel is between six and eight feet in length, a nominal temperature rise of 60° F. (33° C.) will cause a thermal expansion difference over such length of between one-half inch and three-quarters of an inch (12.7 to 19.05 mm). If the panel is securely coupled to the van interior, significant bowing and distortion of the panel will result. One solution that has been proposed and has met with some success comprehends the use of elongate openings, either in the sidewall panel or the van itself, which, in conjunction with a conventional fastener, allow one member to move relative to the other. This solution, however, necessitates the forming of complex fastener openings in the sidewall panel, the cargo van sidewall components or both. Furthermore, such a mounting arrangement acknowledges that the coupling between the sidewall panel and the van will be loose rather than secure, which is not desirable.

It is thus apparent that improvements in the configuration of van sidewall protectors and fastening configurations which address these difficulties are desirable.

SUMMARY OF THE INVENTION

Interior sidewall protection panels for a cargo van incorporate expansion absorbers which allow equalization the disparate thermal expansions of the sidewall panel and the cargo van without causing distortion of the panel. The sidewall protection panel includes a plurality of horizontally ribbed or convoluted regions which are interrupted by flat vertical strips or panels which align with the vertical braces or strainers on the interior of the cargo van. At the intersection of the horizontally ribbed regions with the flat vertical strips is a U-shaped expansion accommodating member. The sidewall protection panel is secured to the vertical strainers of the cargo van at preferably two points along the strip by semi-permanent, positive fastening means.

Given a sidewall protection panel fabricated of high density polyethylene (HDPE) and having a length of between six and eight feet (1.83 to 2.44 meters), a temperature rise of 60° F. (33° C.) may cause free expansion of a typical sidewall panel of from one-half to three-quarters of an inch (12.7 mm to 19.05 mm) more than the body of the van. The U-shaped expansion accommodating members readily absorb this disparate thermal expansion and eliminate unsightly and possibly damaging distortion of the sidewall panel. Furthermore, the positive securement of the panel to the cargo van strainers simplifies product design, installation and aesthetics. An alternate embodiment W-shaped expansion accommodating member also forms a portion of this invention.

Thus it is an object of the present invention to provide a sidewall protection panel for the interior of a cargo van.

It is a further object of the present invention to provide a sidewall protection panel for the interior of a cargo van which includes vertically oriented expansion absorbing or accommodating members which absorb the greater thermal expansion of the panel than the cargo van.

It is a still further object of the present invention to provide a sidewall protection panel for a cargo van which are fabricated of high density polyethylene (HDPE).

It is a still further object of the present invention to provide a sidewall protection panel for a cargo van having a plurality of horizontally ribbed or convoluted regions which are interrupted by spaced apart expansion accommodating members and vertical strips or panels which align with the vertical strainers of a van.

It is a still further object of the present invention to provide a sidewall protection panel for a cargo van which includes a plurality of vertical panels having U-shaped expansion accommodating members disposed on each side.

It is a still further object of the present invention to provide a sidewall protection panel for a cargo van which includes a plurality of vertical panels having W-shaped expansion accommodating members disposed on each side.

Further objects and advantages of the present invention will become apparent by reference to the following description of the preferred embodiment and appended drawings wherein like reference numerals refer to the same feature, element or component.

BRIEF DESCRIPTION OF THE DRAWINGS

FIG. 3 is a front, elevational view of a sidewall protection panel according to the present invention;

FIG. 4 is a top, plan view of a sidewall protection panel according to the present invention illustrating the expansion accommodating members;

DESCRIPTION OF THE PREFERRED AND ALTERNATE EMBODIMENTS

Figure 1:
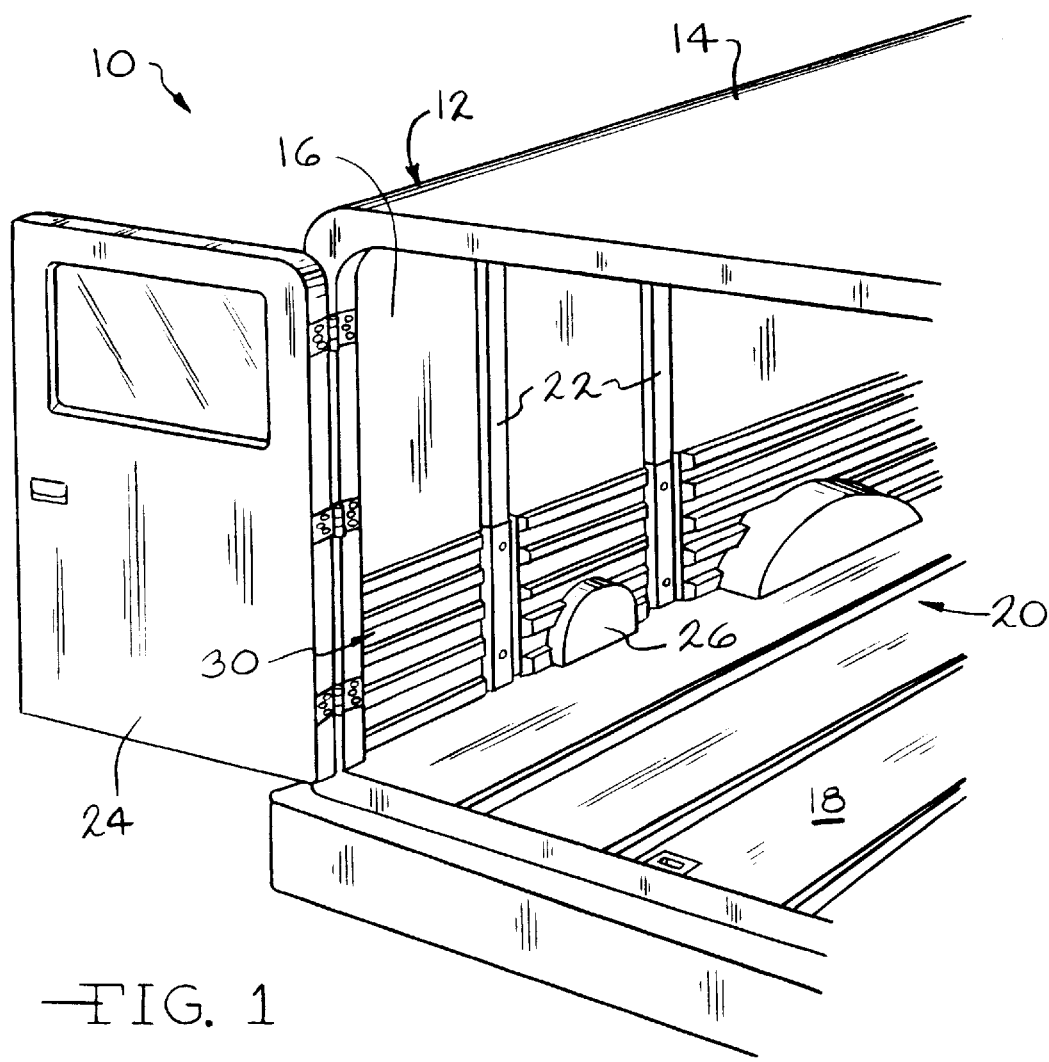
FIG. 1 is a fragmentary, perspective view of a cargo van having a sidewall protection panel installed therein.

Referring to FIG. 1, a portion of a conventional cargo van is illustrated and generally designated by the reference numeral 10. The cargo van 10 includes a sheet metal shell 12 having a roof 14, a pair of sidewalls 16, one of which is illustrated in FIG. 1, and a floor 18 which all cooperatively define an interior cargo space 20. The pair of sidewalls 16 are reinforced at appropriate intervals by vertically oriented reinforcing strainers 22 which are secured to the floor 18, sidewalls 16 and roof 14 by weldments and/or adhesives. Typically, the cargo van 10 will include at least one hinged door 24. Housings 26 or wheel wells for the gas filler or rear wheels, respectively, may project into the cargo space 20 from one or both of the sidewalls 16.

As noted, since each of the pair of sidewalls 16 are formed or stamped from a single sheet of sheet metal, objects (not illustrated) disposed within the interior space 20 of the cargo van 10 may move about and dent the sidewalls 16 causing damage to the sidewalls 16 which is readily visible from the exterior of the cargo van 10. Accordingly, a sidewall protection panel 30 is typically disposed along the left sidewall 16 of the cargo van 10, if the right (passenger) side has door access, and along both sidewalls 16 if both sides of the cargo van 10 are fixed.

Figure 2:
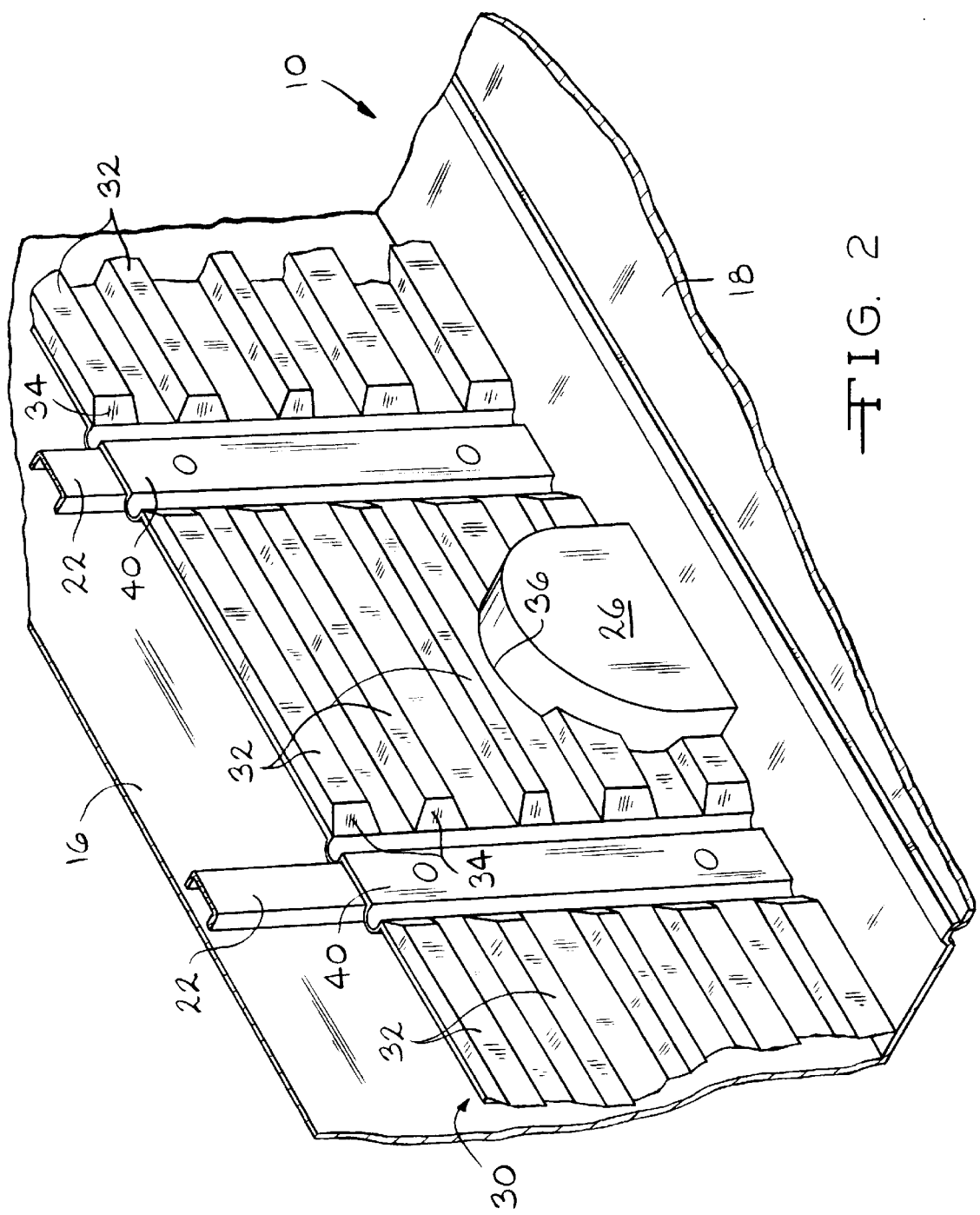
FIG. 2 is an enlarged, fragmentary perspective view of a sidewall protection panel according to the instant invention installed within a cargo van.

Turning now to FIG. 2, the sidewall protection panel 30 includes a plurality of horizontally spaced apart groups of parallel, horizontal convolutions 32. The convolutions 32 may define repeating trapezoidal or non-repeating trapezoidal shapes as illustrated or may define repeating or non-repeating sinuous convolutions, obliquely oriented slats, panels or other cross sections as desired. The purpose of the convolutions 32 is to provide rigidity and strength to the sidewall protection panel 30 and thus any configuration of convolutions or oblique slats or panels lying in or arranged between spaced apart parallel planes of reasonable vertical height and transverse depth which increase the rigidity of the sidewall protection panel 30 are appropriate.

The convolutions 32 include obliquely oriented end sections or caps 34 which close off the ends of the convolutions 32 and further strengthen the sidewall protection panel 30. The convolutions 32 may also include cut out regions 36 which align with and seat around the housings 26 or the wheel wells. Between the groups of horizontal convolutions 32 are vertical strips or panels 40 which define a width at least as wide as the interior face width of the strainers 22. In a similar complementary manner, the center-to-center spacing of the vertical strips 40 of the sidewall protection panel 30 is equal to the center-to-center spacing of the strainers 22 at corresponding locations within the cargo van 10 such that the vertical strips 40 of the sidewall protection assembly panel 30 match and align with the vertical strainers 22 when the sidewall panel 30 is installed in the cargo van 10. Preferably disposed in spaced apart pairs along the vertical strips 40 are apertures 42 for receiving fasteners as will be more fully described subsequently.

Turning now to FIGS. 2, 3 and 4, the sidewall protection panel 30 also includes a plurality of U-shaped expansion accommodating ribs or members 50 which interconnect the vertical strips 40 with the convolutions 32 and end caps 34. The term "expansion accommodating" refers to and includes any structure having sufficient resiliency and flexibility to allow or accommodate expansion and contraction along longitudinal axes lying in the plane defined generally by the sidewall protection panel 30 while providing relatively positive and secure coupling between the convolutions 32 and the strips or panels 40 along both vertical and transverse axes, that is, both axes normal to the longitudinal axes.

The expansion members 50 are disposed parallel to the vertical strip 40 and define curved or re-entrant regions having a width, that is, a distance between the vertical strip 40 and the edges of the convolutions 32 and end caps 34 between about one-half inch to one inch (12.7 mm to 25.44 mm). The thickness of the curved or re-entrant regions is not critical although it is preferably less than the thickness of the material in other regions of the sidewall protection panel 30. The U-shaped expansion members 50 as noted, are disposed on both sides of the vertical strips 40 which are secured to the vertical strainers 22 of the cargo van and thus represents substantially fixed locations by virtue of their attachment to the cargo van 10. The U-shaped members 50 thus interconnect each of the fixed vertical strips 40 with the groups of convolutions 32 and provide a flexible region capable of absorbing or accommodating the dimensional difference caused by the disparate coefficients of thermal expansion between the material of the sidewall protection panel 30, typically high density polyethylene (HDPE) and the steel of the cargo van 10.

Figure 5:
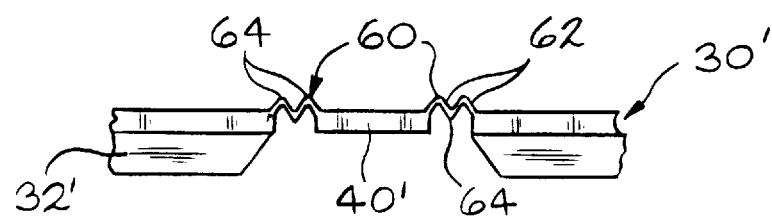
FIG. 5 is a top, plan view of an alternate embodiment expansion accommodating member for a sidewall protection panel according to the present invention.

Referring now to FIG. 5, an alternate embodiment expansion accommodating member for a sidewall protection panel 30' is illustrated and generally designated by the reference numeral 60. The alternate embodiment expansion accommodating member 60 is utilized with a sidewall protection panel 30' which includes horizontal convolutions 32' and is in all respects (except the expansion member) the same as the preferred embodiment sidewall protection panel 30. The alternate embodiment expansion member 60 includes a plurality of obliquely oriented vertically extending strips or panels 62 interconnected by live hinges 64. The strips 62 and hinges 64 define a "W" shape in cross section which may also be characterized as an accordion type or pleated expansion accommodating member. It will be appreciated that a pair of panels 62 and a single live hinge 64 (forming a "V") or three panels 62 and a pair of live hinges 64 may be utilized if desired.

In the foregoing disclosure, the expansion accommodating or absorbing members 50 and 60 have been utilized and illustrated in pairs with one member of each pair disposed on each end of the convolutions 32 or, considered somewhat differently, one member of each pair disposed on each side of the vertical strip or panel 40. However, it should be appreciated that depending upon variables such as the strainer-to-strainer distance, that is, the longitudinal distance between securement points, the difference between the thermal coefficients of expansion of the material from which the sidewall protection panel 30 and van 10 are fabricated and the size of the expansion accommodating members 50 and 60, it may be possible or necessary to utilize a single such expansion accommodating member 50 or 60 adjacent a set of convolutions or a panel or strip 40 if it is capable of accommodating the thermal growth encountered.

Figure 6:
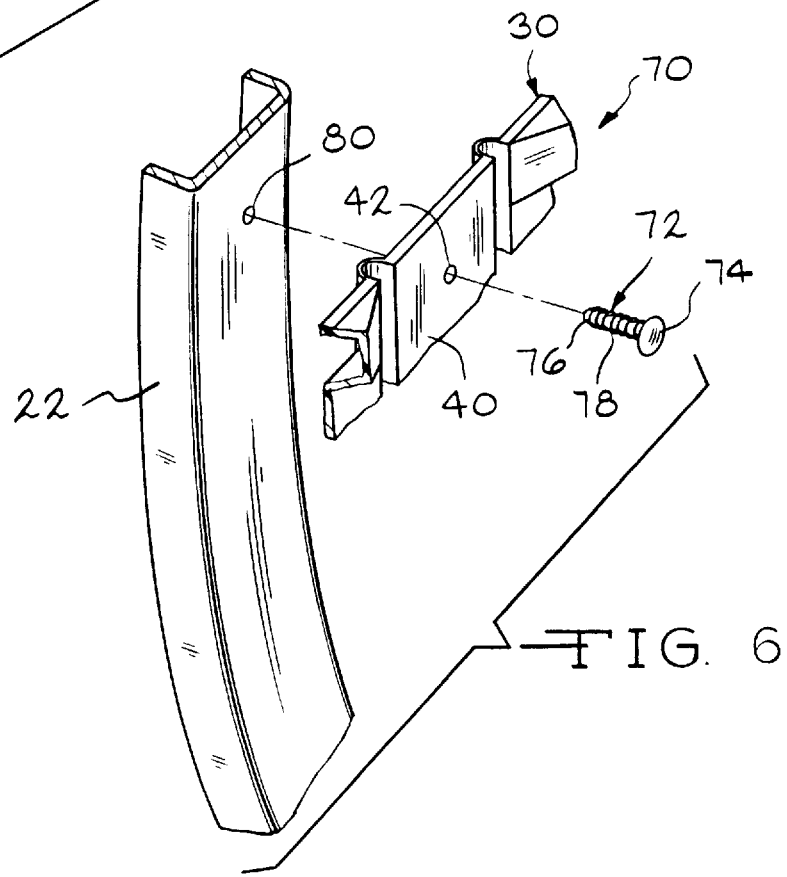
FIG. 6 is a preferred embodiment of a fastener assembly for securing the sidewall protection panel to a sidewall strainer of the cargo van.

Referring now to FIG. 6, a preferred attachment assembly 70 is illustrated. The preferred attachment assembly 70 comprehends the use of semi-permanent "Christmas tree" or similar speed fastener 72 having a head 74 and a shank 76 having collapsible saw tooth like ribs 78. The speed fastener 72 is aligned with the aperture 42 in the vertical strip 40 of the sidewall protection panel 30 and the aperture 42 is aligned with a similarly sized aperture 80 appropriately located in the vertical strainer 22. The sidewall protection panel 30 may thus be readily secured to and retained on the strainers 22 by pushing the fasteners 72 through the apertures 42 and 80 as will be readily appreciated.

Figure 7:
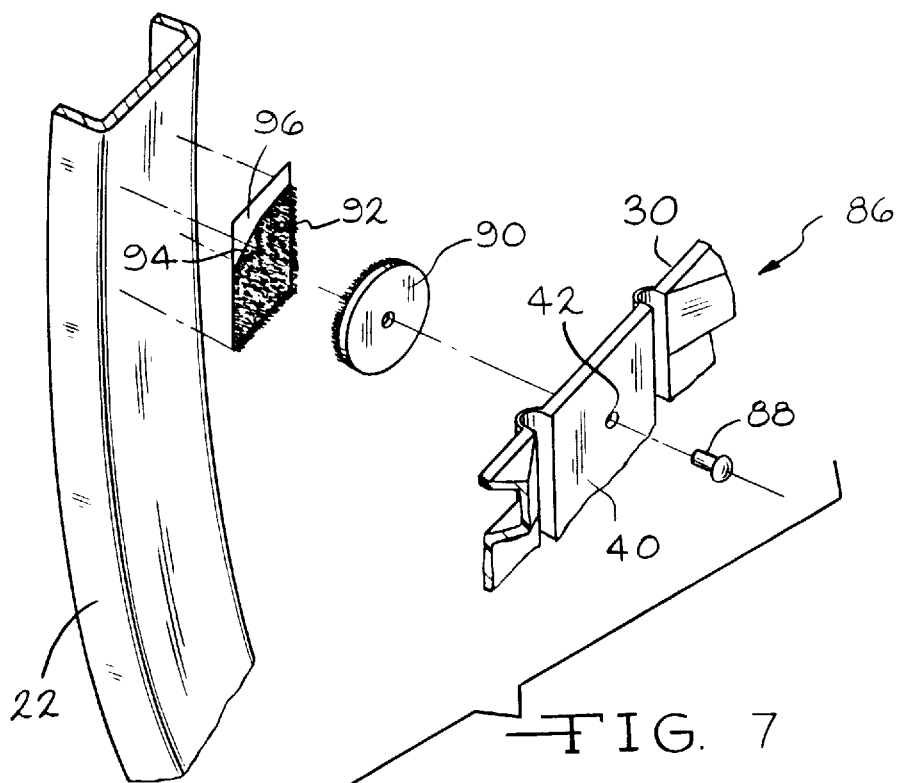
FIG. 7 is a first alternate embodiment fastener assembly for securing the sidewall protection panel to a sidewall strainer in a cargo van.

Referring now to FIG. 7, a first alternate embodiment fastener assembly 86 is illustrated. Here again, the sidewall protection panel 30 includes pairs of apertures 42 on the vertical strip 40 which receive a corresponding number of rivets 88 which retains one-half of a peelable or removable fastener such as a Dual Lock fastener 90. Dual Lock is a trademark of the 3M Company. The first component of the Dual Lock fastener 90 is permanently secured to the sidewall protection panel 30 by a rivet or similar fastener. A second, mating Dual Lock component 92 includes an adhesive surface 94 and protective film 96. Initially, the two Dual Lock components 90 and 92 may be secured together, the protective film 96 removed and the entire sidewall protection assembly 30 appropriately disposed and secured by virtue of the exposed adhesive surfaces 94 to the vertical strainers 22 of the cargo van 10. In order to remove the sidewall protection panel 30 for service or for other reasons, the Dual Lock components 90 and 92 may be pulled apart, the service performed and the sidewall protection panel 30 reinstalled by pressing the Dual Lock components 90 and 92 together again.

The foregoing disclosure is the best mode devised by the inventor for practicing this invention. It is apparent, however, that products incorporating modifications and variations will be obvious to one skilled in the art of molded components. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A protective panel for the cargo compartment of a motor vehicle comprising, in combination,
    a panel section defining a front surface adjacent the cargo compartment of such motor vehicle, a back surface adjacent a sidewall of such motor vehicle and a longitudinal axis and ends extending transversely to said longitudinal axis,
    an elongated strip disposed adjacent each of said panel section, and
    an expansion accommodating member formed in one piece with each of said ends of said panel section and said elongated strip for accommodating dimensional differences along said axis of said panel section.

2. The protective panel of claim 1 wherein said front surface and said rear surface are spaced apart by a plurality of convolutions extending perpendicularly to said elongate strip.

3. The protective panel of claim 1 wherein said panel is fabricated of high density polyethylene.

4. The protective panel of claim 1 wherein said elongate strip includes at least two openings for receiving fasteners.

5. The protective panel of claim 1 wherein said expansion accommodating member is a semi-cylindrical region.

6. The protective panel of claim 1 wherein said elongate strip is disposed adjacent a strainer in such cargo compartment and includes releasable fasteners for securing said panel to said strainer.

7. A protective panel for the interior of a motor vehicle comprising, in combination,
    a strip for vertical disposition adjacent an interior vertical member of such motor vehicle,
    a panel for protecting the sidewall of such motor vehicle disposed adjacent said strip, said panel having a plurality of convolutions extending therealong, and
    an expansion accommodating member formed in one piece with said strip and said panel section.

8. The protective panel of claim 7 wherein said front surface and said rear surfaces are spaced apart by a plurality of convolutions extending perpendicularly to said strip.

9. The protective panel of claim 7 wherein said panel is fabricated of high density polyethylene.

10. The protective panel of claim 7 wherein said strip includes at least two openings for receiving fasteners.

11. The protective panel of claim 7 wherein said expansion accommodating member is semi-cylindrical.

12. The protective panel of claim 7 wherein said vertical member is a strainer and further including releasable fasteners for securing said panel to said strainer.

13. A panel for protecting the sidewall of a motor vehicle cargo compartment comprising, in combination,
    a plurality of sections having horizontally extending convolutions for strengthening said section,
    a panel interposed between the ends of adjacent ones of said sections, and
    an expansion accommodating member formed in one piece with and extending between and coupling said plurality of sections and said interposed flat panel for absorbing dimensional expansion of an adjacent one of said sections relative to such motor vehicle.

14. The protective panel of claim 13 wherein said panel is fabricated of high density polyethylene.

15. The protective panel of claim 13 wherein said panel includes at least two openings for receiving fasteners.

16. The protective panel of claim 13 wherein said expansion accommodating member is semi-cylindrical.

17. The protective panel of claim 13 wherein said panel is disposed adjacent a vertical member in such cargo compartment of such motor vehicle and further including releasable fasteners for securing said panel to said vertical member.

* * * * *